US008896522B2

(12) United States Patent
Valik et al.

(10) Patent No.: US 8,896,522 B2
(45) Date of Patent: Nov. 25, 2014

(54) USER-CENTRIC THREE-DIMENSIONAL INTERACTIVE CONTROL ENVIRONMENT

(75) Inventors: Andrey Valik, Miass (RU); Pavel Zaitsev, Miass (RU); Dmitry Morozov, Miass (RU); Alexander Argutin, Miass (RU)

(73) Assignee: 3DiVi Company, Miass (RU)

( * ) Notice: Subject to any disclaimer, the term of this patent is extended or adjusted under 35 U.S.C. 154(b) by 247 days.

(21) Appl. No.: 13/541,681

(22) Filed: Jul. 4, 2012

(65) Prior Publication Data

US 2013/0009865 A1     Jan. 10, 2013

(30) Foreign Application Priority Data

Jul. 4, 2011   (RU) ................................ 2011127116

(51) Int. Cl.
*G09G 5/00*    (2006.01)
*G06F 3/03*    (2006.01)
*G06F 3/01*    (2006.01)

(52) U.S. Cl.
CPC .............. *G06F 3/0304* (2013.01); *G06F 3/017* (2013.01)
USPC ................................ 345/156; 345/8; 345/633

(58) Field of Classification Search
CPC ....... G06F 3/0304; G06F 3/011; G06F 3/017; A63F 13/10; A63F 2300/1012; A63F 2300/1093; A63F 2300/6661; A63F 2300/6676
USPC ........ 345/8, 156–184, 474, 581, 633; 463/29, 463/36; 382/103–110; 348/36, 51, 77, 143, 348/222.1, 207.99
See application file for complete search history.

(56) References Cited

U.S. PATENT DOCUMENTS

| 6,323,846 | B1 * | 11/2001 | Westerman et al. .......... 345/173 |
| 7,590,262 | B2 | 9/2009 | Fujimura et al. |
| 7,874,917 | B2 | 1/2011 | Marks et al. |
| 7,883,415 | B2 * | 2/2011 | Larsen et al. ................... 463/36 |
| 7,974,443 | B2 | 7/2011 | Kipman et al. |
| 8,169,405 | B2 | 5/2012 | Hunleth et al. |
| 8,253,746 | B2 * | 8/2012 | Geisner et al. ................ 345/474 |
| 8,502,864 | B1 * | 8/2013 | Watkins .......................... 348/52 |
| 8,593,375 | B2 * | 11/2013 | Maltz ............................... 345/8 |
| 2004/0141635 | A1 * | 7/2004 | Liang et al. .................... 382/110 |
| 2004/0227992 | A1 * | 11/2004 | Putilin et al. .................. 359/462 |

(Continued)

FOREIGN PATENT DOCUMENTS

| CN | 101344816 A | 1/2009 |
| RU | 2382408 C2 | 2/2010 |
| RU | 2410259 C2 | 1/2011 |

*Primary Examiner* — Prabodh M Dharia
(74) *Attorney, Agent, or Firm* — Patent Jurist; Georgiy L. Khayet

(57) ABSTRACT

A computer-implemented method and system for controlling various electronic devices by recognition of gestures made by a user within a particular space defined in front of the user are provided. An example method may comprise generating a depth map of a physical scene, determining that a head of the user is directed towards a predetermined direction, establishing a virtual sensing zone defined between the user and a predetermined location, identifying a particular gesture made by the user within the virtual sensing zone, and selectively providing to the electronic device a control command associated with the particular gesture. The particular gesture may be performed by one or more characteristic forms provided by the user within the virtual sensing zone being in an active state. The characteristic forms are forms reliably distinguishable from casual forms by means of computer vision and having certain attributes, which can reliably reflect user intent.

19 Claims, 9 Drawing Sheets

(56) References Cited

U.S. PATENT DOCUMENTS

| | | |
|---|---|---|
| 2006/0187196 A1 | 8/2006 | Underkoffler et al. |
| 2007/0060336 A1 | 3/2007 | Marks et al. |
| 2007/0139370 A1* | 6/2007 | Lu et al. .................. 345/156 |
| 2008/0070684 A1 | 3/2008 | Haigh-Hutchinson |
| 2009/0209346 A1 | 8/2009 | Cheng et al. |
| 2009/0268945 A1 | 10/2009 | Wilson et al. |
| 2009/0296992 A1* | 12/2009 | Liang et al. .................. 382/110 |
| 2010/0033427 A1* | 2/2010 | Marks et al. .................. 345/156 |
| 2010/0277489 A1* | 11/2010 | Geisner et al. ............... 345/581 |
| 2010/0290698 A1 | 11/2010 | Freedman et al. |
| 2011/0052006 A1 | 3/2011 | Gurman et al. |
| 2011/0081969 A1 | 4/2011 | Ikeda et al. |
| 2011/0090149 A1* | 4/2011 | Larsen et al. ................ 345/158 |
| 2011/0102570 A1* | 5/2011 | Wilf et al. ...................... 348/77 |
| 2011/0154266 A1 | 6/2011 | Friend et al. |
| 2011/0262002 A1 | 10/2011 | Lee |
| 2011/0292036 A1 | 12/2011 | Sali et al. |
| 2011/0296333 A1* | 12/2011 | Bateman et al. .............. 715/773 |
| 2012/0128201 A1 | 5/2012 | Brickhill |
| 2012/0200600 A1* | 8/2012 | Demaine ...................... 345/633 |
| 2012/0249590 A1* | 10/2012 | Maciocci et al. ............. 345/633 |
| 2012/0249591 A1* | 10/2012 | Maciocci et al. ............. 345/633 |
| 2012/0249741 A1* | 10/2012 | Maciocci et al. ............... 348/46 |

\* cited by examiner

USER-CENTRIC THREE-DIMENSIONAL INTERACTIVE CONTROL ENVIRONMENT

CROSS-REFERENCE TO RELATED APPLICATIONS

This application is Continuation-in-Part of Russian Patent Application Serial No. 2011127116, filed on Jul. 4, 2011, which is incorporated herein by reference in its entirety for all purposes.

TECHNICAL FIELD

This disclosure relates generally to human-computer interfaces and, more particularly, to the technology of controlling various electronic devices by recognition of gestures made by a user within a particular space defined in front of the user.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

As the range of activities accomplished with various computer-based devices increases, new interactive interfaces to control these devices are developed and are in great demand. For example, gesture recognition control systems (also known as motion sensing input systems) are now widely used to interact with gaming consoles, video adapters, displays, computers, and so forth. In particular, these control systems are configured to detect user gestures or motions, and once a particular gesture is detected, a corresponding control command is generated and sent to an electronic device causing it to perform certain actions. Gestures can originate from any bodily movement or pose, and this provides a unique way to interact with computer-based devices.

The gesture recognition control systems may be based on various gesture recognition approaches, which involve depth sensing devices (also known as three-dimensional (3D) sensor devices) or video cameras of high resolution capable of recognizing users' gestures or motions by processing obtained acquired depth data and/or captured images. Once a certain gesture is detected, a particular command associated with the gesture is generated and transmitted to an electronic device for further performing of a certain action.

Typically, the gesture interactive systems, when enabled, monitor and track all actions performed by users within a monitored area. This approach has two major drawbacks. First, it requires immoderate computational resources and high computing load to perform processing of high-resolution images or depth data. Second, users tend to perform both dedicated gestures and involuntary motions. However, the gesture interactive systems make no difference between them and may treat involuntary motions as dedicated ones and therefore perform certain actions. This may irritate users and decrease the effectiveness of the user interaction. In view of the foregoing, there is still a need for improvements of gesture interactive systems that will increase interaction effectiveness and reduce required computational resources.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure refers to gesture recognition control systems configured to identify various user gestures and generate corresponding control commands. More specifically, the technology disclosed herein can generate a scene depth map in real time with the help of one or more depth sensing devices and/or video cameras. The depth map is then analyzed by a computing unit to identify whether or not a user is presented on the depth map. If the user is located within the monitored area, an orientation of the user head can be determined. The user head orientation can be determined by position of the nose, eyes, irises, skeleton reference points, or any other suitable technique. Further, a virtual three-dimensional sensing zone is established in front of the user. This virtual sensing zone can be defined as a depth range arranged at a predetermined distance from the user towards the depth sensing device or any other predetermined location. In an example, a cubical-shape virtual sensing area can be generated and associated with the user in front of the user. The computing device further analyzes only those gestures which are made by the user within the virtual sensing zone. Moreover, the gestures can be recognized and tracked when the virtual sensing zone is in active state only. The virtual sensing zone becomes active, when user's attention is directed along a predetermined direction. For example, if the user looks towards the depth sensing device, the virtual sensing zone becomes "active", and all gestures within the active sensing zone are identified and tracked. However, on the other hand, if the user turns away or goes away so that his gaze is not directed towards the depth sensing device, the sensing zone becomes "inactive" and no gestures are tracked. This approach enables significantly reduce computational resources needed for gesture recognition and there is also no need to use a high resolution depth sensing device as there are tracked user gestures performed within a very limited space only, while all other gestures made within the overall depth sensing device monitoring area are not recognized and/or tracked.

According to the present technology, the gestures captured within the active sensing zone may refer to "characteristic forms" only. The term "characteristic form", as used herein, refers to a gesture form reliably distinguishable from casual forms (or objects) by a means of computer vision and having certain attributes (including a certain size, orientation, and so forth) which can reliably reflect control intentions of the user. For example, the characteristic form may refer to a "pointer" which can be presented by a user as a pointing finger pointing towards a predetermined direction or when the user holds a pole-like object, such as a television remote control, and points it towards a predetermined direction. In another example, the characteristic form may refer to a "palm" when all user fingers are straight and a plane-like gesture is made. In general, it should be understood that the characteristic forms may refer to various hand shapes, sequences of certain hand shapes, gestures made by various handheld objects, and so forth.

A specific control command is generated when the user provides a characteristic form during a predetermined time period (e.g., 3 seconds) based on characteristic form location (e.g., specific coordinates within a virtual sensing zone being an active state), a velocity of motion, acceleration, trajectory, time of exposure, or their combinations, including a situation when two or more gestures associated with characteristic forms are provided one after another.

Thus, the present disclosure discloses various methods for generating control commands for an electronic device based upon recognition of gestures related to characteristic forms made within a predetermined virtual volumetric sensing zone defined in front of the user. Below is provided a simplified summary of one or more aspects regarding these methods in order to provide a basic understanding of such aspects as a prelude to the more detailed description that is presented later.

In accordance with one aspect, there is provided a computer-implemented method for generating control commands for an electronic device. An example method may comprise generating a depth map of a physical scene, determining that a head of the user is directed towards a predetermined direction, establishing a virtual sensing zone defined between the user and a predetermined location, identifying a particular gesture made by the user within the virtual sensing zone, and selectively providing to the electronic device a control command associated with the particular gesture.

According to various embodiments, the particular gesture may comprise a characteristic form. The particular gesture may also comprise a series of characteristic forms provided by the user in a successive manner with a predetermined time period. Furthermore, the particular gesture can be identified when the user provides the particular gesture during a predetermined time period. In addition, the particular gesture can be identified when the particular gesture is provided within the virtual sensing zone being in an active state.

According to various embodiments, the virtual sensing zone is in the active state, when the head of the user is directed towards the predetermined direction. The predetermined direction can be associated with the depth sensing device or the electronic device.

According to various embodiments, the method may further comprise tracking gestures and motions made by the user within the virtual sensing zone being in the active state.

According to various embodiments, the identification of the particular gesture made by the user within the virtual sensing zone may comprise determining one or more attributes of the gesture, whereas the attributes include one or more of the following: a velocity, an acceleration, a trajectory, a time of exposure, and a location, and determining that the one or more attributes refer to one or more predetermined attributes.

According to various embodiments, determination that the head of the user is directed towards the predetermined direction may comprise determination one or more of the following: a position of eyes of the user, a position of pupils or a contour of irises of the eyes, an orientation of a user nose, an angle of inclination of the head, a rotation of the head, and an orientation of a user skeleton.

According to various embodiments, the virtual sensing zone can be defined by a depth range between the user and the predetermined location. The virtual sensing zone can be arranged at a predetermined distance from the user or the predetermined location. Further, the virtual sensing zone can be defined by a particular length, a particular width, and a particular height. The virtual sensing zone may comprise a virtual cube, a parallelepiped, or a truncated parallelepiped.

According to various embodiments, the method may further comprise acquiring biometric data associated with the user and authenticating the user, based on analysis of the biometric data, before the control command is selectively provided to the one or more electronic devices. The analysis of the biometric data may comprise one or more of the following: face recognition, recognition of a user body, recognition of a characteristic shape, and recognition of a user motion dynamics pattern.

In further examples, the above methods steps are stored on a machine-readable medium comprising instructions, which when implemented by one or more processors perform the steps. In yet further examples, subsystems or devices can be adapted to perform the recited steps.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION

Figure 1:
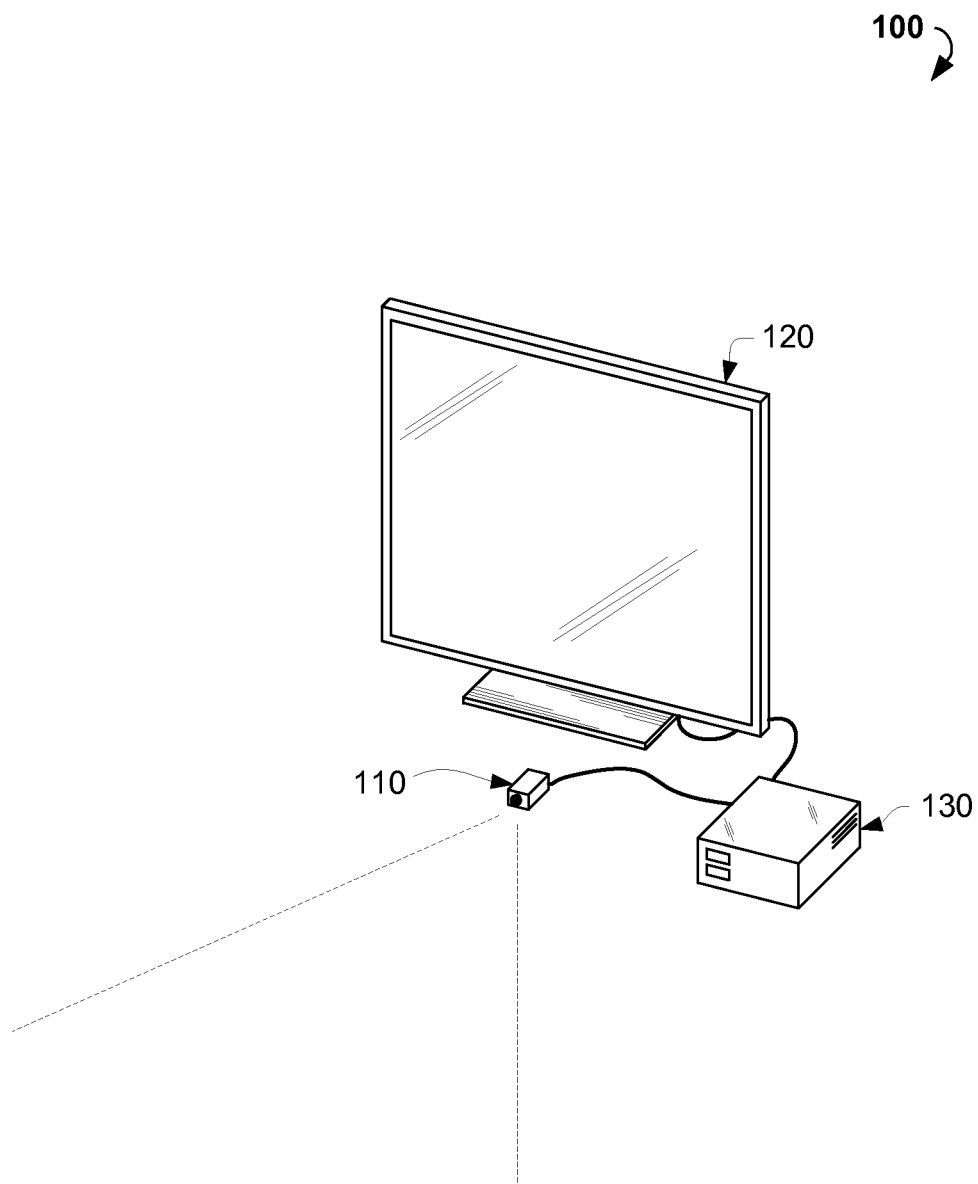
FIG. 1 shows an example system environment for providing a real time human-computer interface.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium.

The embodiments described herein relate to gesture recognition control systems and computer-implemented methods for controlling an electronic device by recognition of user gestures. In general, a recognition control system includes one or more depth sensing devices and/or video cameras for generating a depth map and/or successive images of scene in real time. The depth map is then processed by a computing device to identify and track only those user gestures which relate to characteristic forms. The computing device can be operatively coupled to or embed the depth sensing sensor(s) and/or video camera(s). Some examples of computing devices may include a processor, controller, computer (e.g., a desktop computer, laptop computer, tablet computer), gaming console, audio system, video system, cellular phone, smart phone, Personal Digital Assistance (PDA), set-top box, television set, smart television system, or any other wired or wireless electronic device.

Once a user gesture is identified based on depth map processing and interpretation, a corresponding control command can be generated. In various embodiments, the generated control command can be selectively outputted by the computing device to a particular electronic device or a group of electronic devices. For instance, a control command generated by the computing device and associated with a particular gesture can be sent to an entertaining system such as gaming console, audio system, video system, display, computer, and so forth. In other words, the computing device can be coupled to multiple electronic devices of the same or various types for their controlling. However, in various embodiments, the computing device is integrated with one or more controlled electronic devices. For instance, the computing device and depth sensing device/video camera can be integrated with a gaming console.

Those skilled in the art would appreciate that the computing device, depth sensing device/video camera, and various controlled electronic devices can be integrated with each other or interconnected in numerous different ways. It should also be understood that such systems may consist of at least some parts of "intelligent house" and may be used as part of home automation systems.

In operation, the gesture recognition control system generates a depth map of a physical scene in real time. By processing the depth map, the gesture recognition control system can detect a user and then identify a user head and further a user head orientation (if this is impossible due to a low resolution of the depth sensing device/video camera, a user orientation is determined by reference points of its skeleton). It is then determined whether the user head (or user gaze) is directed towards a predetermined direction such as a display, depth sensing device, gesture recognition control system, any of controlled electronic device, or any other electronic device. The head orientation of the user can be determined by the depth sensing device, video camera, or combination of both, using any suitable approach including determining user gaze, position of user eyes, position of the pupils, contour of irises, position of user nose, angle of inclination of the head, a rotation of the head, reference points of skeleton, and so forth.

Further, the depth map is processed to establish a virtual volumetric sensing zone, which is defined by a depth range between the user and the depth sensing device, whereas the depth range is arranged at a particular distance from the user towards a predetermined direction such as the depth-sensing device, and whereas the depth range is also limited in the direction perpendicular to a line between the user and the predetermined direction (e.g., the depth sensing device). In an example, the virtual volumetric sensing zone may be represented as a three-dimensional (3D) cube parallelepiped, or truncated parallelepiped generated in front of the user. The virtual volumetric sensing zone can be "movable" and may depend on the user orientation or user gaze. The virtual volumetric sensing zone can also be in either an active state or inactive state. More particularly, the sensing zone is in the active state, when the user is located within monitoring area of the depth sensing device, and when the user head or user gaze is oriented towards a predetermined direction such as the depth sensing device or display. On the other hand, the sensing zone is in the inactive state, when the user is located outside of the monitoring area of the depth sensing device, or when the user head is not oriented towards the depth sensing device or any other predetermined direction. Therefore, the gesture recognition control system is configured to identify and track only those user gestures that are performed within the virtual sensing zone being in the active state.

Furthermore, the gesture recognition control system may track specific user gestures only such as "characteristic forms". As mentioned, the characteristic forms refer to user gestures which can be reliably distinguishable from casual forms, objects, or gestures, and which have certain attributes including a certain size, orientation, shape, location, motion characteristics (velocity, acceleration), and so forth. For example, the characteristic form may refer to a "pointer" which can be presented by the user as a pointing finger pointing towards a predetermined direction or when the user holds a pole-like, cone-like, or prolonged object, such as a television remote controller, and points it towards a predetermined direction. In another example, the characteristic form may refer to a "palm" when all user fingers are flat and a plane-like gesture is made. In yet another example, the characteristic form may refer to a "fist" when all user fingers are bended. It should be understood that the characteristic forms refer to various hand shapes, sequences of certain hand shapes, gestures made by various handheld objects, and so forth. In addition, a number of successive gestures, poses of user hand or handheld pointing device, may constitute a single "characteristic form". Furthermore, the characteristic forms can be identified by the gesture recognition control system, when the user provides a particular characteristic form during a predetermined period of time (e.g., 3 seconds). In an another example, the user may need to provide two or more successive characteristic forms (gestures) so that the gesture recognition control system identifies them and generates a particular control command.

Thus, the gesture recognition control system may generate control commands for one or more electronic devices when there are identified gestures associated with characteristic forms made by the user within the predetermined virtual sensing zone being in the active state. Thus, there is no need for the depth sensing device to track the entire room or observable space. It also allows excluding recognition of false gestures (i.e., when users make gestures when they do not look at the depth-sensing device or any other dedicated direction). The gesture recognition control system thereby becomes very effective and more convenient for use.

In addition to tracking gestures of a particular user, the gesture recognition control system may embed a biometric authentication sub-system. More specifically, the depth sensing device and/or video camera may acquire biometric data associated with the user and then process the biometric data to authenticate the user and track his or her gestures. The authentication of biometric data may refer to one or more of face recognition, recognition of the body of the user, recognition of the motion dynamic pattern of the user, recognition of characteristic form biometric data, and so forth.

Furthermore, the user gestures may be associated with particular control commands. For example, when the user provides a "pointer" characteristic shape (e.g., when the user points by a forefinger or by a handheld pointing device towards a predetermined direction such as a display), a pointer may be displayed on the display screen to show the position on the display. The pointer can be moved over the screen in accordance with the hand motion of the user. According to another example, when the user lifts or shows a palm towards the display (which may be in proximity of or be integrated with the depth sensing device), the display may scroll down information shown on the display screen. Although there are two examples provided, those skilled in the art would appreciate that any other gestures can be used and assigned with any other executable actions.

Provided below is a detailed description of various embodiments related to methods and systems of generating control commands for one or more electronic devices.

With reference now to the drawings, FIG. 1 shows an example system environment 100 for providing a real time human-computer interface. The system environment 100 includes a gesture recognition control system 110, a display device 120, and an entertaining system 130.

The gesture recognition control system 110 is configured to capture various user gestures and user inputs, interpret them and generate corresponding control commands which are further transmitted to the entertaining system 130. Once the entertaining system 130 receives commands generated by the gesture recognition control system 110, perform certain actions depending on running software application. For example, the user may control a pointer on the display screen by making certain gestures.

The entertaining system 130 may refer to any electronic device such as a computer (e.g., a laptop computer, desktop computer, tablet computer, workstation, server), game console, Television (TV) set, TV adapter, smart television system, audio system, video system, cellular phone, smart phone, and so forth. Although the figure shows that the gesture recognition control system 110 and the entertaining system 130 are separate and stand-alone devices, in some alternative embodiments, these systems can be integrated within a single device.

Figure 2:
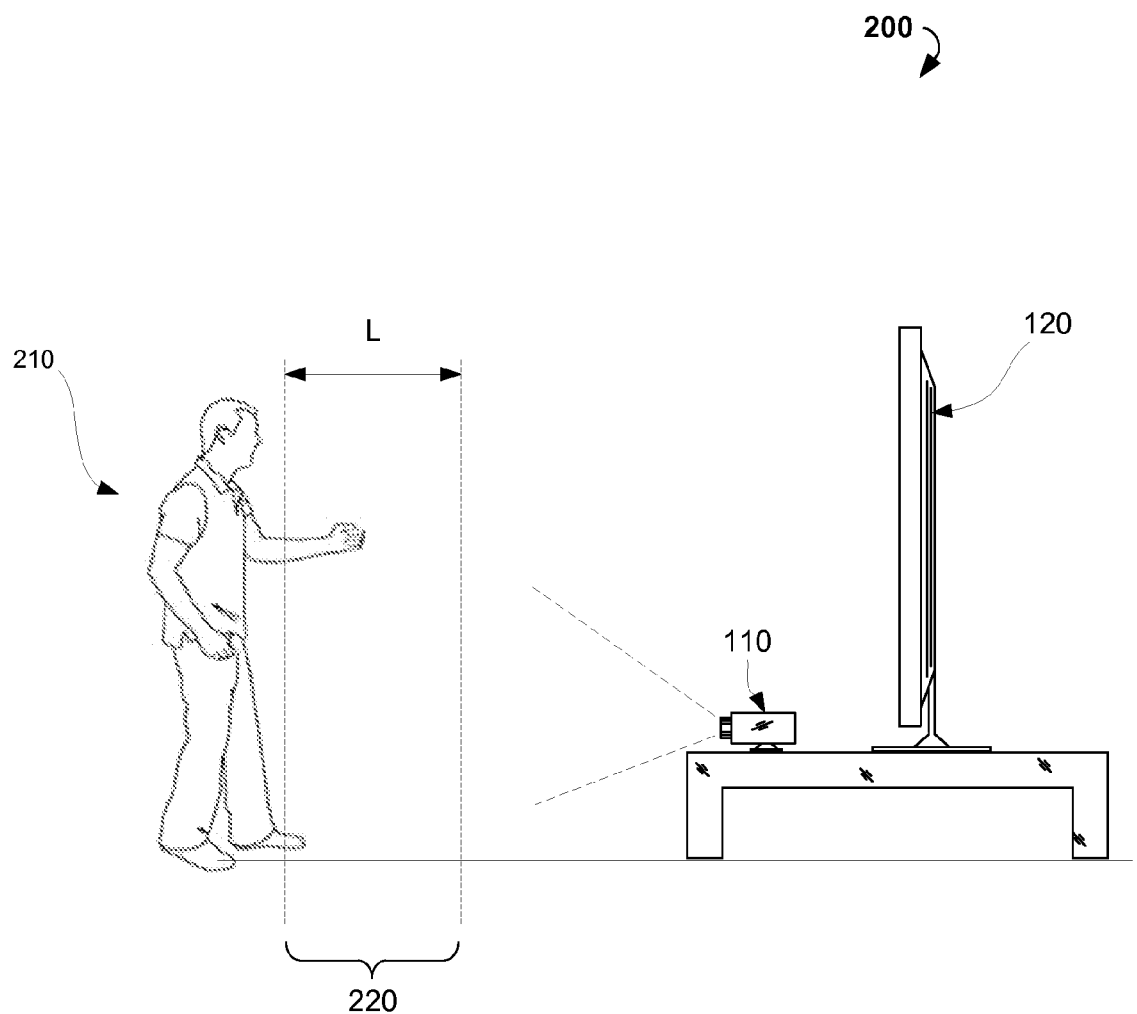
FIG. 2 is a general illustration of scene suitable for implementing methods for controlling one or more electronic devices by recognition of user gestures.

FIG. 2 is a general illustration of scene 200 suitable for implementing methods for controlling one or more electronic devices by recognition of user gestures. In particular, FIG. 2 shows a user 210 interacting with the gesture recognition control system 110 by providing gestures. The gesture recognition control system 110 may include a depth sensing device, a video camera, and a computing unit, which can be stand-alone devices or embedded within a single housing (as shown). In particular, the gesture recognition control system 110 may be configured to acquire depth values by the depth sensing device to generate a depth map in real time. Further, the gesture recognition control system 110 may optionally capture a series of images using the video camera to facilitate recognition and authentication of the user and identification of user gestures. The acquired depth values and optionally captured images are transmitted to and processed by the computing unit. By the result of image processing, the computing unit may first identify the user 210 and then establish a virtual volumetric sensing zone 220 defined between the user 210 and the gesture recognition control system 110 so that the sensing zone is defined by a depth range having a distance L. The depth range has also a particular width and a particular height. As mentioned, the sensing zone 220 may refer to a virtual volumetric cube or parallelepiped arranged in front of the user 210. The sensing zone 220 may be oriented towards a particular direction (i.e., towards the depth sensing device, a display, a computer, or alternatively, in a direction of the user's gaze).

The gesture recognition control system 110 is also configured to determine, based on the acquired depth values and optionally captured images, a user head orientation. The user head orientation can be determined by detecting one or more of: a gaze of the user, position of user eyes, position of the pupils, or contour of the irises of the eyes, position of user nose, angle of inclination of user head, rotation of user head, and optionally reference points of user skeleton. The user head orientation may be used for assigning a particular status to the virtual sensing zone 220. The status of the virtual sensing zone 220 is set to "active", when the user head is oriented towards a predetermined direction (the gesture recognition control system 110, depth sensing device, display, game console, etc.). On the other hand, when the user head orientation is not directed towards the predetermined direction or when the user out of the monitoring zone, the status of the virtual sensing zone 220 is set to "inactive".

The gesture recognition control system 110 is also configured to identify if the user 210 makes any gestures related to characteristic forms within the virtual sensing zone 220 being in the active state. If a particular characteristic form is identified within the active virtual sensing zone 220, the gesture recognition control system 110 interprets the identified characteristic form and generates a corresponding control command. The control command is then sent to a dedicated electronic device (e.g., the entertaining system 130).

Thus, the user 210 may interact with the gesture recognition control system 110 by making gestures or various motions with his or her hands, fingers, handheld pole-like object, or a combination thereof. All of these motions or gestures can be predetermined so that the gesture recognition control system 110 is able to identify them, match them to a list of pre-stored user commands, and generate a particular command for the electronic devices. In other words, the gesture recognition control system 110 may be "taught" to identify and differentiate one or another motion or gesture.

Figure 3A:
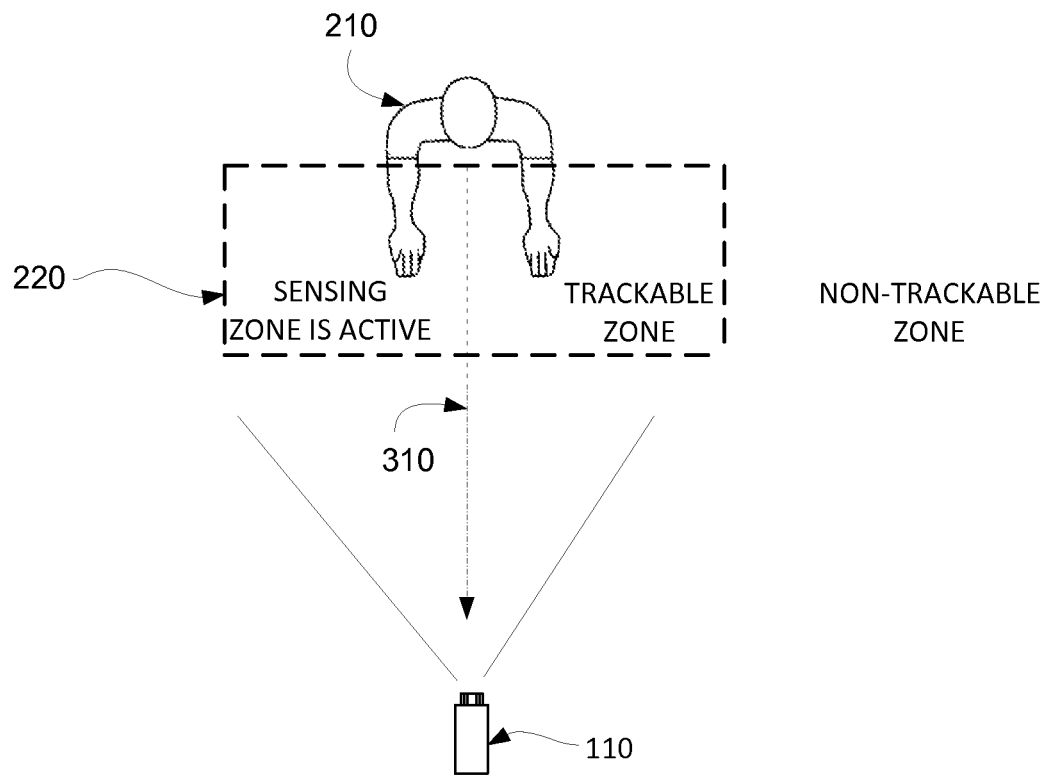
FIGS. 3A-3C are example representations showing a top view of the user interacting with the gesture recognition control system within or out of virtual sensing zone.

FIG. 3A is an example representation showing a top view of the user 210 interacting with the gesture recognition control system 110 within a virtual sensing zone 220 being in the active state. As shown in the figure, the virtual sensing zone 220 defines a volumetric space, such as 3D parallelepiped, tracked by the gesture recognition control system 110. In other words, gestures and motions made within the active virtual sensing zone 220 are tracked, while gestures, motions, or objects behind the active virtual sensing zone 220 are not tracked. In one example, when the user 210 places his or her hands within the active virtual sensing zone 220, the gesture recognition control system 110 detects and tracks characteristic forms.

In various embodiments, the virtual sensing zone 220 is defined by a depth range defined in front of the user 210 and arranged in the between the user 210 and a predetermined direction including, for example, the gesture recognition control system 110, its parts, or a particular controlled electronic device such as an entertaining system. The virtual sensing zone 220 may have limited width, height, and length.

The virtual sensing zone 220 may become in the active state when it is determined that a head direction 310 of the user 210 (or the user orientation defined by the user skeleton) is directed towards a predetermined direction, which may include the gesture recognition control system 110, its parts, or a particular controlled electronic device such as the display or entertaining system. In the example shown, the user head is directed towards the gesture interactive system 110, and in this case, the virtual sensing zone 220 is thus active, which means characteristic forms presented within the virtual sensing zone 220 will be tracked and recognized by the gesture recognition control system 110.

Figure 3B:
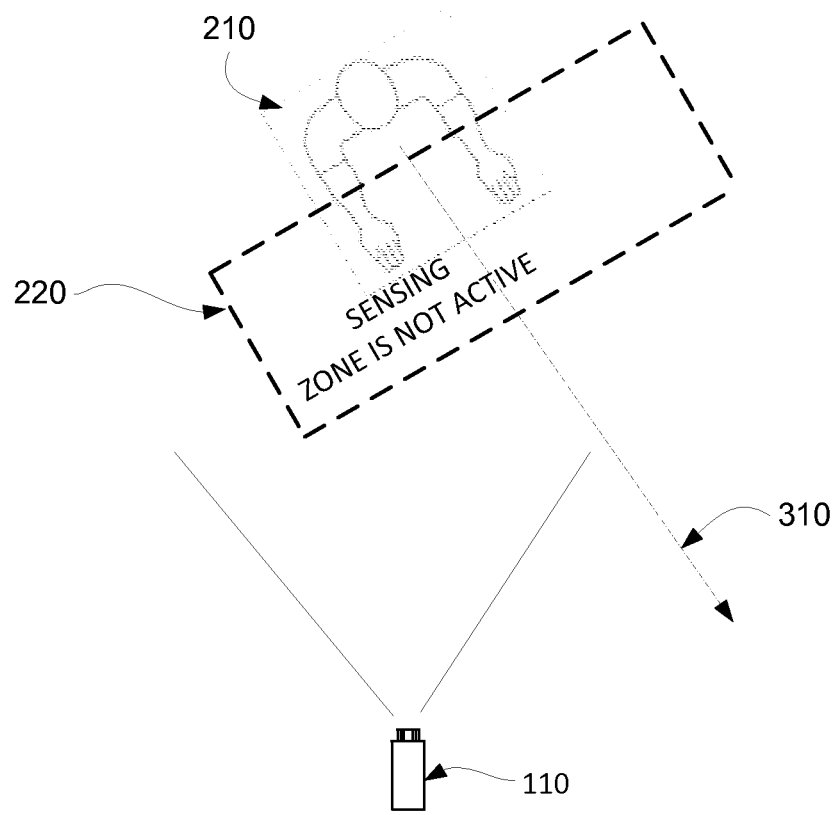

FIG. 3B is an example representation showing a top view of the user 210 not interacting with the gesture recognition control system 110. More specifically, in the shown example, the virtual sensing zone 220 is in the inactive state, since the user head orientation direction 310 (or user orientation defined by the user skeleton) is not directed towards the predetermined direction, such as the gesture recognition control system 110, but outside of this direction.

Accordingly, although the user may generate hand gestures within the virtual sensing zone 220, no gestures are identified and tracked by the gesture recognition control system 110 as the virtual sensing zone 220 is in the inactive state.

Figure 3C:
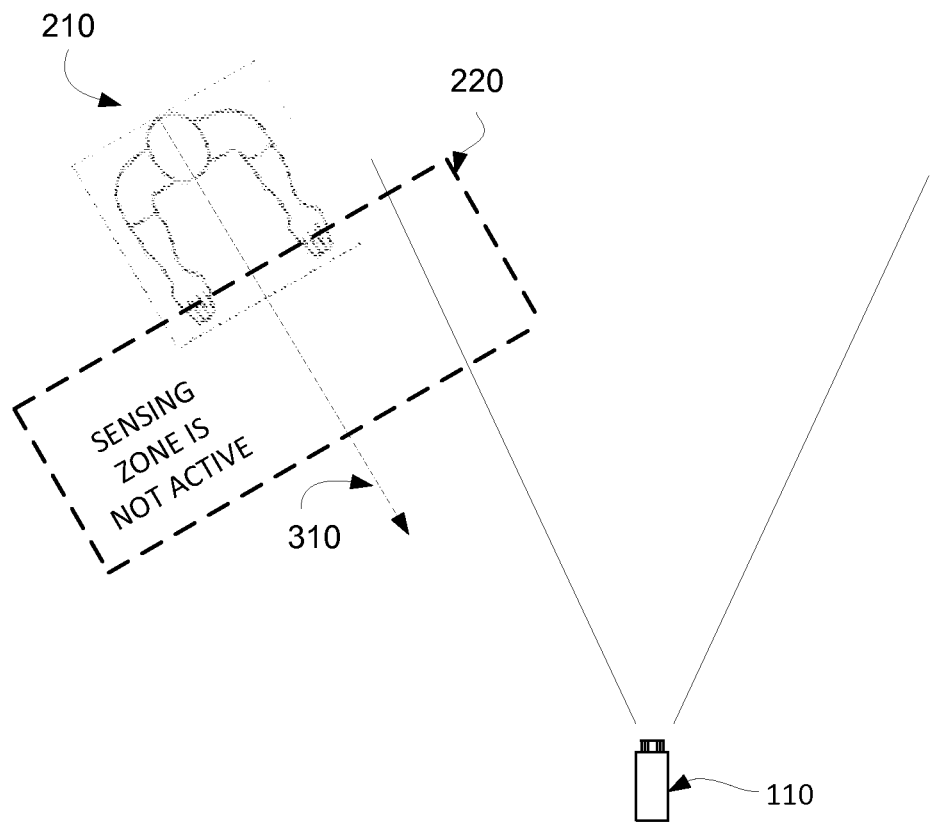

FIG. 3C is an example representation showing a top view of the user 210 not interacting with the gesture interactive system 110. In particular, the head direction 310 of the user 210 is directed towards the predetermined direction which coincides with the gesture recognition control system 110. However, the virtual sensing zone 220 is in the inactive state since the user is outside of the monitoring area. Thus, no user gestures will be identified or tracked.

Figure 4:
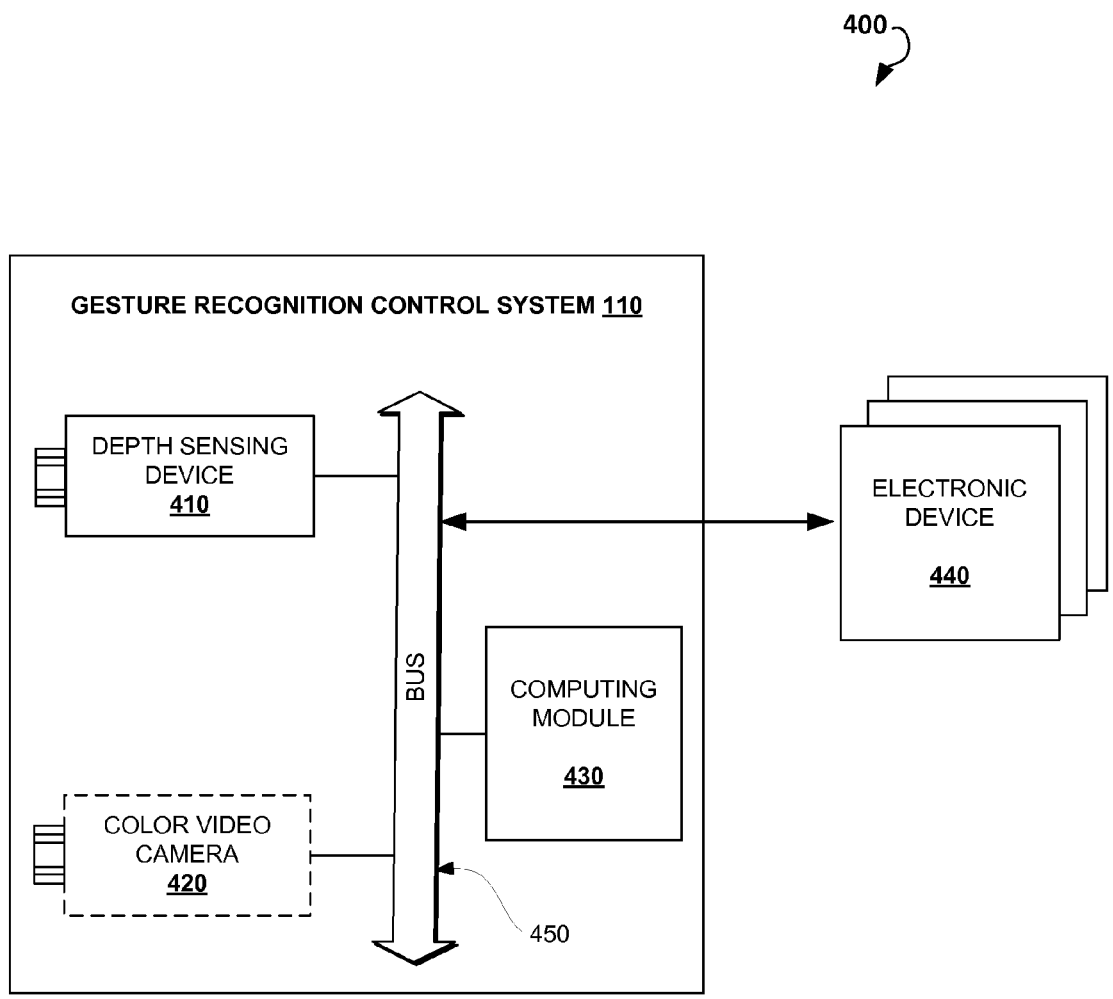
FIG. 4 shows an environment suitable for implementing methods for controlling one or more electronic devices by recognition of user gestures.

FIG. 4 shows an environment 400 suitable for implementing methods for controlling one or more electronic devices by recognition of user gestures. As shown in this figure, there is provided the gesture recognition control system 110, which may comprise at least one depth sensing device 410 configured to acquire depth values and generate a depth map. In some other embodiments, the depth sensing device 410 may include an infrared (IR) projector to generate modulated light and also an IR camera to capture 3D images. In yet more example embodiments, the gesture recognition control system 110 may comprise the color video camera 420 to capture a series of 2D images in addition to 3D imagery created by the depth sensing device 410. The depth sensing device 410 and the color video camera 420 can be either stand alone devices or be encased within a single housing.

Furthermore, the gesture recognition control system 110 may also comprise a computing module 430 for processing depth map (and optionally captured images), identify characteristic forms provided by the user 210 within the active virtual sensing zone 220, and generating corresponding control commands for one or more electronic devices 440. The gesture recognition control system 110 may also include a bus 450 interconnecting the depth sensing device 410, the color video camera 420, and the computing module 430. According to yet another embodiment, the gesture recognition control system 110 may also include a communication module (not shown) configured to provide communication between the gesture recognition control system 110 and the one or more electronic devices 440.

The aforementioned one or more electronic devices 440 can refer, in general, to any electronic device configured to trigger one or more predefined actions upon receipt of a certain control command. Some examples of electronic devices 440 include, but are not limited to, computers, workstations, servers, laptop computers, tablet computers, displays, audio systems, video systems, gaming consoles, lighting devices, cellular phones, smart phones, television systems, and so forth.

The one or more electronic devices 440 can be coupled to the gesture interactive system 110 via a network (not shown). The network can be a net of data processing nodes interconnected for the purpose of data communication, which may be utilized to communicatively couple various components of the environment 400. The network may include the Internet or any other network capable of communicating data between devices. Suitable networks may include or interface with any one or more of the following: local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, dial-up port such as a V.90, V.34 or V.34bis analog modem connection, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

Figure 5:
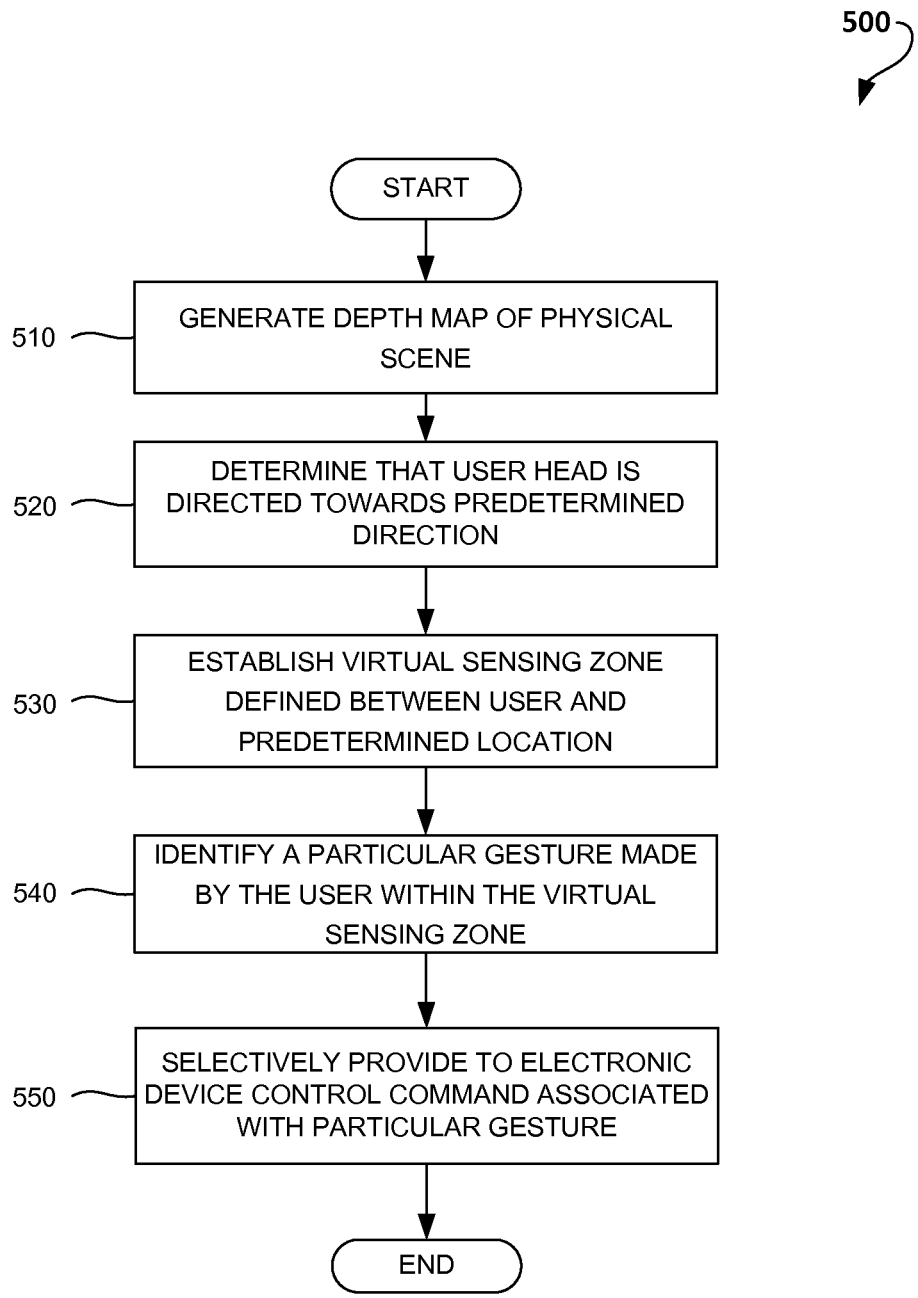
FIG. 5 is a process flow diagram showing a method for controlling one or more electronic devices by recognition of user gestures, according to an example embodiment.

FIG. 5 is a process flow diagram showing a method 500 for controlling one or more electronic devices 440 by recognition of gestures made by the user 210 according to an example embodiment. The method 500 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the gesture recognition control system 110.

The method 500 can be performed by the units/devices discussed above with reference to FIG. 4. Each of these units or devices can comprise processing logic. It will be appreciated by one of ordinary skill in the art that examples of the foregoing units/devices may be virtual, and instructions said to be executed by a unit/device may in fact be retrieved and executed by a processor. The foregoing units/devices may also include memory cards, servers, and/or computer discs. Although various modules may be configured to perform some or all of the various steps described herein, fewer or more units may be provided and still fall within the scope of example embodiments.

As shown in FIG. 5, the method 500 may commence at operation 510, with the depth sensing device 410 acquiring distances from the depth sensing device 410 towards the physical scene and generating a depth map.

At operation 520, the computing module 430 determines that the user head orientation 310 is directed towards a predetermined direction. This predetermined direction may relate to the gesture interactive system 110, depth-sensing device 410, electronic device 440 (e.g., a display), or any other direction. The user head direction 310 can be determined by user gaze, user nose orientation, position of user eyes, position of pupils, contour of irises, angle of inclination of the head, and rotation of user head.

At operation 530, the computing module 430 establishes a virtual sensing zone 220 defined between the user 210 and a predetermined location, which may coincide with the gesture interactive system 110, depth-sensing device 410, or electronic device 440. The virtual sensing zone 220 may be either in an active or inactive state. The active state is defined by the user head orientation 310. If it was determined that the user head is oriented towards the predetermined direction, the virtual sensing zone 220 is in the active state. Otherwise, when it was not determined that the user head is oriented towards the predetermined direction, the virtual sensing zone 220 is in the inactive state.

At operation 540, the computing module 430 identifies a particular gesture made by the user 210 within the virtual sensing zone 220 being in the active state. The particular gesture made by the user 210 may refer to characteristic forms. A particular characteristic form and its characteristics, such a velocity, acceleration, trajectory, time of exposure, and location, can be identified by the computing module 430 through processing of the depth map and optional 2D images captured by the color video camera 420.

At operation 550, the computing module 430 selectively provides to the electronic device 440 a control command associated with the particular gesture identified at operation 540.

In various embodiments, the method may further comprise an optional operation (not shown) when biometric data associated with the users 210 are acquired, and based on analysis of this biometric data, the user is authenticated. Accordingly, the control command can be generated and selectively provided to the one or more electronic devices 440 when the identified gesture is related to the authenticated user 210 only.

The aforementioned biometric data may include any biometrics such as face outline, user body outline, user skeleton, user motion dynamics pattern, and so forth. The biometric data may be acquired via the depth-sensing device 410 and/or the color video camera 420, or any other peripheral electronic device.

Figure 6:
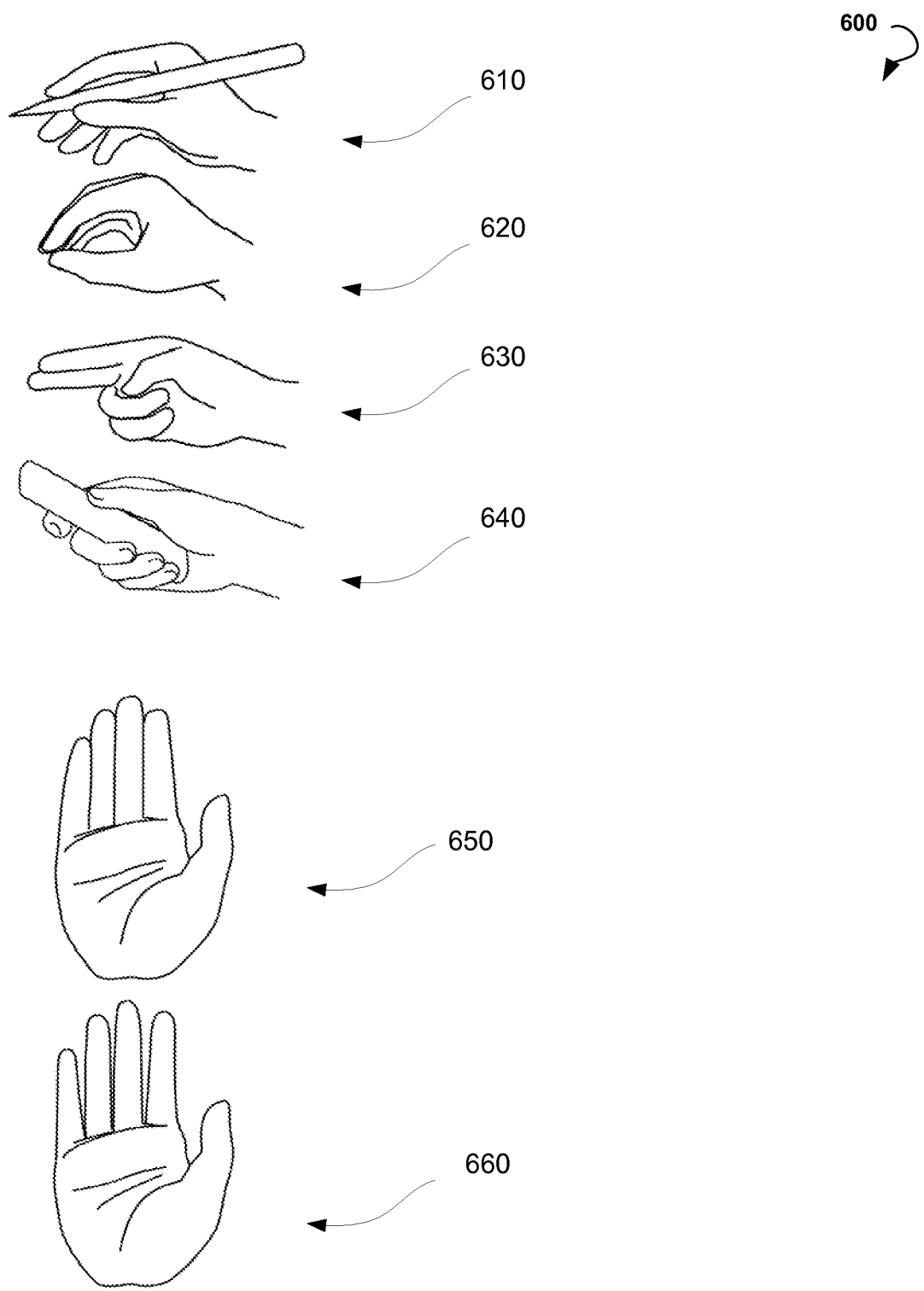
FIG. 6 is a representation showing example characteristic forms, which may be associated with particular control commands.

FIG. 6 is an example representation showing characteristic forms, which may be associated with particular control commands. For example, if the user 210 provides "pointing" characteristic forms 620 and 630 with one or more fingers, or gestures 610 and 640 with handheld objects, a pointer may be displayed on the displaying device. When the user provides "palm" characteristic forms 650 or 660 by lifting or positioning a palm towards the depth sensing device 410, the displaying device may scroll down information shown on the screen of the displaying device.

Figure 7:
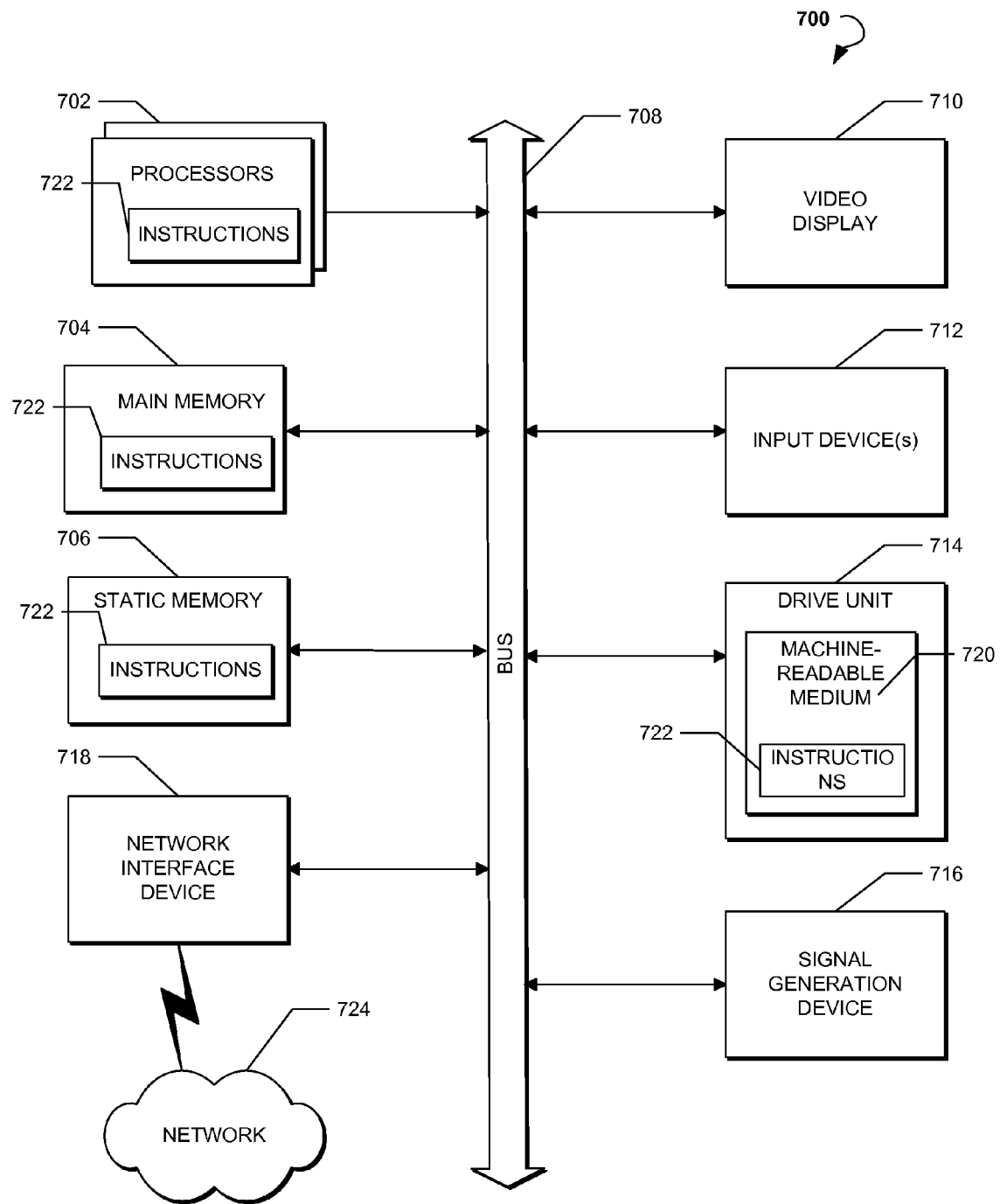
FIG. 7 is a diagrammatic representation of an example machine in the form of a computer system within which a set of instructions for the machine to perform any one or more of the methodologies discussed herein is executed.

FIG. 7 shows a diagrammatic representation of a computing device for a machine in the example electronic form of a computer system 700, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), PDA, cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 700 includes a processor or multiple processors 702 (e.g., a central processing unit (CPU), graphics processing unit (GPU), or both), main memory 704 and static memory 706, which communicate with each other via a bus 708. The computer system 700 can further include a video display unit 710 (e.g., a liquid crystal display (LCD) or cathode ray tube (CRT)). The computer system 700 also includes at least one input device 712, such as an alphanumeric input device (e.g., a keyboard), cursor control device (e.g., a mouse), microphone, digital camera, video camera, and so forth. The computer system 700 also includes a disk drive unit 714, signal generation device 716 (e.g., a speaker), and network interface device 718.

The disk drive unit 714 includes a computer-readable medium 720 that stores one or more sets of instructions and data structures (e.g., instructions 722) embodying or utilized by any one or more of the methodologies or functions described herein. The instructions 722 can also reside, completely or at least partially, within the main memory 704 and/or within the processors 702 during execution by the computer system 700. The main memory 704 and the processors 702 also constitute machine-readable media.

The instructions 722 can further be transmitted or received over the network 724 via the network interface device 718 utilizing any one of a number of well-known transfer protocols (e.g., Hyper Text Transfer Protocol (HTTP), CAN, Serial, and Modbus).

While the computer-readable medium 720 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine, and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The example embodiments described herein may be implemented in an operating environment comprising computer-executable instructions (e.g., software) installed on a computer, in hardware, or in a combination of software and hardware. The computer-executable instructions may be written in a computer programming language or may be embodied in firmware logic. If written in a programming language conforming to a recognized standard, such instructions may be executed on a variety of hardware platforms and for interfaces associated with a variety of operating systems. Although not limited thereto, computer software programs for implementing the present method may be written in any number of suitable programming languages such as for example, C, C++, C#, Cobol, Eiffel, Haskell, Visual Basic, Java, JavaScript, Python, or other compilers, assemblers, interpreters, or other computer languages or platforms.

Thus, methods and systems for controlling one or more electronic devices by recognition of gestures made by a user within a dedicated sensing zone have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for generating control commands for an electronic device, the method comprising:
    generating a depth map of a physical scene;
    determining that a head of the user is directed towards a predetermined direction;
    establishing a predetermined virtual sensing zone defined between the user and a predetermined location, the predetermined virtual sensing zone being located in front of the user;
    activating the predetermined virtual sensing zone in accordance with the determining;
    identifying a particular gesture made by the user within the predetermined virtual sensing zone when the predetermined virtual sensing zone is in an active state; and
    selectively providing to the electronic device a control command associated with the particular gesture.

2. The computer-implemented method of claim 1, wherein the particular gesture comprising a characteristic form.

3. The computer-implemented method of claim 1, wherein the particular gesture comprising a series of characteristic forms provided by the user in a successive manner during one or more predetermined time periods.

4. The computer-implemented method of claim 1, wherein the particular gesture is identified when the user provides the particular gesture during a predetermined time period.

5. The computer-implemented method of claim 1, wherein the predetermined virtual sensing zone is in the active state, when the head of the user is directed towards the predetermined direction.

6. The computer-implemented method of claim 1, further comprising tracking gestures and motions made by the user within the predetermined virtual sensing zone being in the active state.

7. The computer-implemented method of claim 1, wherein identifying the particular gesture made by the user within the predetermined virtual sensing zone comprising:
    determining one or more attributes of the gesture, the attributes comprising one or more of the following: a velocity, an acceleration, a trajectory, a time of exposure, and a location; and
    determining that the one or more attributes refer to one or more predetermined attributes.

8. The computer-implemented method of claim 1, wherein the predetermined direction is associated with the depth sensing device or the electronic device.

9. The computer-implemented method of claim 1, wherein determining that the head of the user is directed towards the predetermined direction comprising determining one or more of the following: a position of eyes of the user, a position of pupils or a contour of irises of the eyes, an orientation of a nose of the user, an angle of inclination of the head, a rotation of the head, and an orientation of a user skeleton.

10. The computer-implemented method of claim 1, wherein the predetermined virtual sensing zone is defined by a depth range between the user and the predetermined location.

11. The computer-implemented method of claim 1, wherein the predetermined virtual sensing zone is arranged at a predetermined distance from the user or the predetermined location.

12. The computer-implemented method of claim 1, wherein the predetermined virtual sensing zone is defined by one or more particular lengths, one or more particular widths, and one or more particular heights.

13. The computer-implemented method of claim 1, wherein the predetermined virtual sensing zone comprising a virtual cube, a parallelepiped, or a truncated parallelepiped.

14. The computer-implemented method of claim 1, further comprising:
    acquiring biometric data associated with the user; and
    authenticating the user, based on analysis of the biometric data, before the control command is selectively provided to the one or more electronic devices.

15. The method of claim 14, wherein the analysis of the biometric data comprises one or more of the following: face recognition, recognition of a user body, recognition of a characteristic shape, and recognition of a user motion dynamics pattern.

16. A system for controlling an electronic device, the system comprising:
    a depth sensing device configured to generate a depth map of a physical scene;
    a computing unit communicatively coupled to the depth sensing device, the computing unit being configured to:
    determine that a head of the user is directed towards a predetermined direction;
    establish a predetermined virtual sensing zone defined between the user and a predetermined location, the predetermined virtual sensing zone being located in front of the user;
    activate the predetermined virtual sensing zone in accordance with the determining;
    identify a particular gesture made by the user within the predetermined virtual sensing zone when the predetermined virtual sensing zone is in an active state; and
    selectively provide to the electronic device a control command associated with the particular gesture.

17. The system of claim 16, further comprising a video camera communicatively coupled to the computing unit, the video camera being configured to capture a series of successive images in real time and facilitate identifying of user head orientation and identifying one or more gestures of the user.

18. The system of claim 16, wherein the particular gesture comprising one or more characteristic forms provided by the used within the predetermined virtual sensing zone being in the active state, wherein the one or more characteristic forms are provided during one or more predetermined time periods.

19. A processor-readable medium having instructions stored thereon, which when executed by one or more processors, cause the one or more processors to:
    generate a depth map of a physical scene;
    determine that a head of the user is directed towards a predetermined direction;
    establish a predetermined virtual sensing zone defined between the user and a predetermined location, the predetermined virtual sensing zone being located in front of the user;
    activate the predetermined virtual sensing zone in accordance with the determining;

identify a particular gesture made by the user within the predetermined virtual sensing zone when the predetermined virtual sensing zone is in an active state; and selectively provide to the electronic device a control command associated with the particular gesture.

\* \* \* \* \*